INVENTORS:
LUDWIG RAICHLE
GUENTHER SCHULZE

Patented July 29, 1952

2,605,147

UNITED STATES PATENT OFFICE 2,605,147

THRUST BALANCING FOR VERTICAL SHAFTS

Ludwig Raichle and Guenther Schulze, Ludwigshafen-on-the-Rhine, Germany

Application August 5, 1950, Serial No. 177,864
In Germany September 17, 1949

3 Claims. (Cl. 308—9)

This invention relates to single or multistage flow machines with rotor shafts arranged in upright position.

Flow machines, such as turbo-compressors, centrifugal pumps, steam turbines, gas turbines and water turbines, having their shafts arranged in a horizontal position have the disadvantage that the weight of the rotors, which is sometimes very considerable, must be taken up by radial bearings which are thereby exposed to high strain and which frequently determine the life of the machine. Furthermore, the critical second order disturbances which under certain conditions are caused by the dead weight of the horizontal rotor occasion an unsteady running and a marked wear of the bearing.

These disadvantages do not arise in flow machines with an upright arrangement, in particular vertical arrangement of the shaft. The difficulty that the whole weight of the rotor must be taken up by a single footstep bearing with high specific loading, however, generally influenced the decision in favour of the horizontal arrangement. On account of the high specific load on the bearing, the vertical arrangement has, therefore, hitherto only been chosen for the lighter machines in cases where expediency and the local circumstances compel such a choice, for example in the case of drill hole pumps and deep well pumps, and not from considerations which have as their aim the avoidance of the said disadvantages inherent in the horizontal arrangement.

We have now found that in flow machines having an upright, in particular a vertical, arrangement of the shaft, a discharging piston built in for the balance of the axial thrust is capable of supporting the weight of the rotor of the flow machine including the weight of the rotor of a driving or driven machine (for example an electric motor or generator) by floating on a conveying or working medium, so that a footstep bearing for supporting the weight can be dispensed with.

The conveying or working medium applicable for the purposes of this invention may be fluid substances, which term is meant to comprise liquid, gaseous or vaporous substances, as for example water, steam or gas mixtures suitable for syntheses, such as mixtures of carbon monoxide and hydrogen.

Figure 1A:
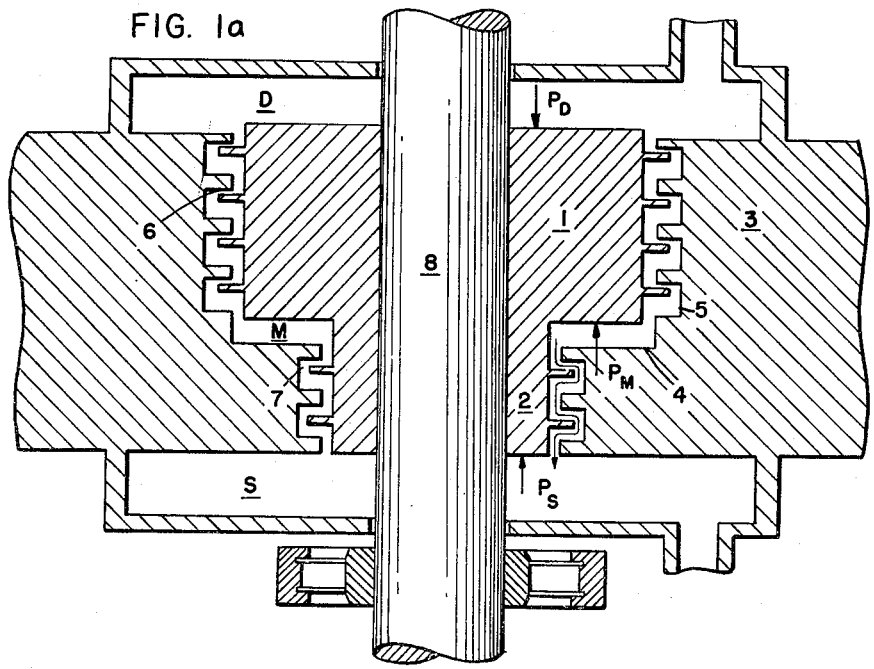
Figure 1B:
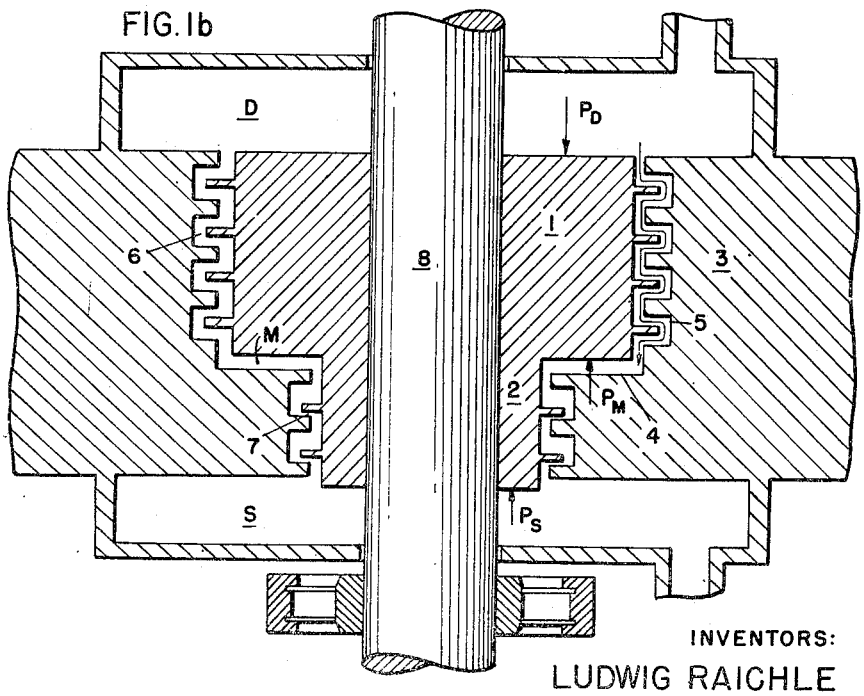

An embodiment of an automatic discharging piston of the said kind, and its manner of operation, will now be described with reference to Figures 1a and 1b of the accompanying drawings, Figure 1a showing diagrammatically the upper end position of the piston, and Figure 1b the lower end position.

Past a stepped piston fixed to a shaft 8 and consisting of a part 1 of large diameter and a part 2 of smaller diameter secured thereto, a small portion of the conveying or working medium can flow from the pressure side D through a central space M to the suction side S. Acting upon the pressure side of the large piston 1 is the pressure $P_D$ while the opposite suction side of the small piston 2 is under the pressure $P_S$. Depending on the position of the discharging piston, a variable pressure $P_M$, intermediate between the pressures $P_D$ and $P_S$, may be set up which effects the balancing of the rotor in the mean position. This is effected by so arranging the grooves 5 which are provided in the large and small pistons 1 and 2 and also in the housings 3 and 4, and which in section have the appearance of teeth, that the gap opening 6 on the large piston 1 is widest (Figure 1b) when the gap opening 7 on the small piston 2 is narrowest, and vice versa (Figure 1a). In the upper end position of the rotor shown in Figure 1a, the gap cross-section of the large piston 1 is smallest and that of the small piston 2 is greatest. Thus the flow between D and M is throttled, while the outflow from M to S is accelerated. The pressure $P_M$ is reduced as compared with $P_D$, i. e. the thrust in the direction of D exerted by the pressure $P_M$ is reduced and the piston is forced by the action of $P_D$ from its upper end position towards S. In the lower end position of the rotor shown in Figure 1b, the gap cross-section is at its minimum at the small piston and at its maximum at the large piston with the result that flow from D to M is sped up while the flow from M to S is checked. The consequence is that $P_M$ increases producing a thrust in the direction D. Under the influence of this alternating play of forces the discharging piston, and with it the rotor shaft, finally hovers in a mean position between the two end positions. Provision should be made by appropriate dimensioning of the piston that it runs substantially in the middle position under the weight load.

With a high pressure difference ($P_D-P_S$) the weight of the rotor may be high. This fact corresponds to natural conditions, for high pressure differences appertain to polystage, and therefore heavy, rotors. With smaller pressure differences the supporting piston cross-section surface should be proportionately larger. The supporting piston cross-section surface and consequently the largest diameter of the piston, in spite of this enlargement, is never determinative for the diameter of the whole machine because by reason of the natural dependence of the piston diameter on the diameter of the rotor, the piston diameter is always smaller than the largest diameter of the rotor.

For the running-in time of the machine from rest to the operating speed, amounting to seconds, i. e. until the necessary pressure difference has been set up in the machine in order to make the rotor float on the conveying or working medium, the weight of the rotor is taken up by a collar bearing which should be of small size on account of the short loading time. The same holds good for that part of the running-out time during which, by reason of the falling speed or the shutting off of the working medium, the pressure difference is insufficient to support the weight of the rotor.

The discharging piston may be arranged either above or below the flow machine in such a way that the weight of the rotor is suspended from or supported on the cushion of the discharging piston floating on the conveying or working medium, the rotor of the driven or driving machine being rigidly connected with the shaft of the flow machine, or being suspended from or supported on the discharging piston together with the flow machine with which it is mounted on a common shaft.

Figure 2:
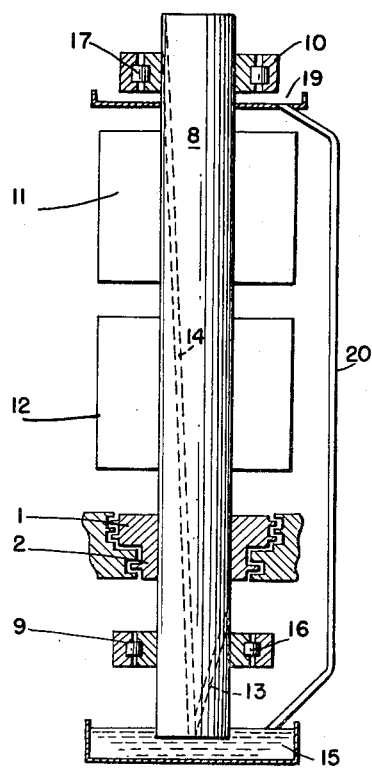

Figure 2 of the accompanying drawings shows diagrammatically the whole aggregate. 8 is the shaft on which the rotor of the driving machine 11, for example an electric motor, and the rotor of the driven machine 12, for example a pump, are mounted. In a turbine plant, the position of the driving machine (turbine) and that of the driven machine (electric generator) would be reversed. 1 and 2 are the two parts of the discharging piston and 9 and 10 are the lower and upper bearings.

It has been found that the lubrication of the bearings can be achieved in an extremely advantageous manner with the arrangement according to the invention. As may be seen from Figure 2, the lubricating oil can be automatically conveyed through the oblique borings 13 and 14 provided in the shaft 8, by the centrifugal acceleration of the rotating shaft, from a reservoir 15 at the foot of the shaft to the bearings 16 and 17 and after lubrication of the bearings is thrown out into a collecting device 19 from which the oil runs back through a conduit 20 into the reservoir 15.

The present invention offers the following advantages: By providing the possibility of supporting maximum rotor weights by a cushion of gas, vapor or liquid during operation without a special footstep bearing, a practically frictionless bearing is achieved and discharged radial bearings are obtained. As the action of dead weight is neutralized, any bending of the shaft as well as the critical second order disturbances are eliminated in all cases. The oil lubrication is achieved automatically.

What we claim is:

1. A bearing for single or multi-stage flow machines having an upright rotor shaft extending axially from said flow machine comprising a discharge piston fixed to said shaft, a housing surrounding said piston, a plurality of teeth on said piston and a plurality of cooperating recesses in said housing adapted to receive said teeth loosely whereby a pressurized fluid medium may pass between said teeth and said recesses to automatically equalize the axial thrust, and means for supplying a pressurized fluid medium to said recesses, thereby to cause said piston to float on a cushion of said fluid medium without a footstep bearing being necessary to support the weight of said flow machine rotor and the rotor of a driving machine.

2. A bearing as claimed in claim 1 wherein the discharge piston is subdivided into a larger and a smaller portion, the teeth on said larger portion being adapted to fit within corresponding recesses in said housing so that the gap therebetween is at a maximum when the gap between the teeth on the smaller portion and corresponding recesses in said housing is at a minimum.

3. A bearing as claimed in claim 2 wherein the pressurized fluid medium is the fluid being conveyed by said flow machine.

LUDWIG RAICHLE.
GUENTHER SCHULZE.

REFERENCES CITED

The following references are of record in the file of this patent:

UNITED STATES PATENTS

| Number | Name | Date |
|---|---|---|
| 1,030,153 | Barbezat | June 18, 1912 |
| 1,570,356 | Lane | Jan. 19, 1926 |
| 2,062,920 | Mapes | Dec. 1, 1936 |
| 2,070,115 | Crane | Feb. 9, 1937 |